United States Patent [19]
Link et al.

[11] Patent Number: 5,904,082
[45] Date of Patent: *May 18, 1999

[54] MULTIPLE-SPINDLE TURNING MACHINE

[75] Inventors: Helmut Link, Aichwald;
Guenther-Heinrich Trautmann,
Kirchheim, both of Germany

[73] Assignee: Index-Werke GmbH & Co. KG Hahn & Tessky, Esslingen, Germany

[ * ] Notice: This patent is subject to a terminal disclaimer.

[21] Appl. No.: 08/730,609

[22] Filed: Oct. 8, 1996

Related U.S. Application Data

[63] Continuation-in-part of application No. PCT/EP96/00537, Feb. 9, 1996.

[30] Foreign Application Priority Data

Feb. 10, 1995 [DE] Germany ................. 195 04 371

[51] Int. Cl.⁶ .................................................. B23B 9/00
[52] U.S. Cl. ........................... 82/129; 82/3; 29/38 B
[58] Field of Search ............... 82/121, 122, 129, 82/132, 141, 157; 29/35.5, 38 B

[56] References Cited

U.S. PATENT DOCUMENTS

| | | | |
|---|---|---|---|
| 3,339,440 | 9/1967 | Tsuda | 82/129 |
| 3,693,485 | 9/1972 | Maurer | 82/3 |
| 3,726,162 | 4/1973 | Sato | 82/3 |
| 3,990,133 | 11/1976 | Schalles et al. | |
| 4,520,595 | 6/1985 | Diener | |
| 4,524,654 | 6/1985 | Lucey | 82/3 |
| 4,779,318 | 10/1988 | Henderson | 29/38 B |
| 5,042,126 | 8/1991 | Simonin | 29/38 B |

FOREIGN PATENT DOCUMENTS

| | | |
|---|---|---|
| 0 298 672 | 1/1989 | European Pat. Off. . |
| 0 433 722 | 6/1991 | European Pat. Off. . |
| 0 516 103 | 12/1992 | European Pat. Off. . |
| 25 28 001 | 9/1976 | Germany . |
| 30 02 647 | 9/1980 | Germany . |
| 37 03 173 | 6/1988 | Germany . |

*Primary Examiner*—Andrea L. Pitts
*Assistant Examiner*—Mark Williams
*Attorney, Agent, or Firm*—Barry R. Lipsitz; Ralph F. Hoppin

[57] ABSTRACT

In order to improve a multiple-spindle turning machine, comprising a machine frame, a cylinder rotatable around an essentially horizontal rotational axis relative to the machine frame, work piece spindles arranged on the cylinder in respective individual positions with spindle axes, which are aligned essentially parallel to the rotational axis and which during the machining of a work piece are movable relative to the cylinder by means of linear drives in the direction of their spindle axis and independently of one another, and tools arranged on tool supports for machining the work pieces held in the work piece spindles, in such a way as to allow the respective work piece spindle to be positioned as precisely as possible in the direction of its spindle axis, it is proposed that each of the work piece spindles is allocated its own linear drive disposed on the cylinder to move it in the direction of the spindle axis, and that the work piece spindle is constantly coupled to the linear drive.

25 Claims, 16 Drawing Sheets

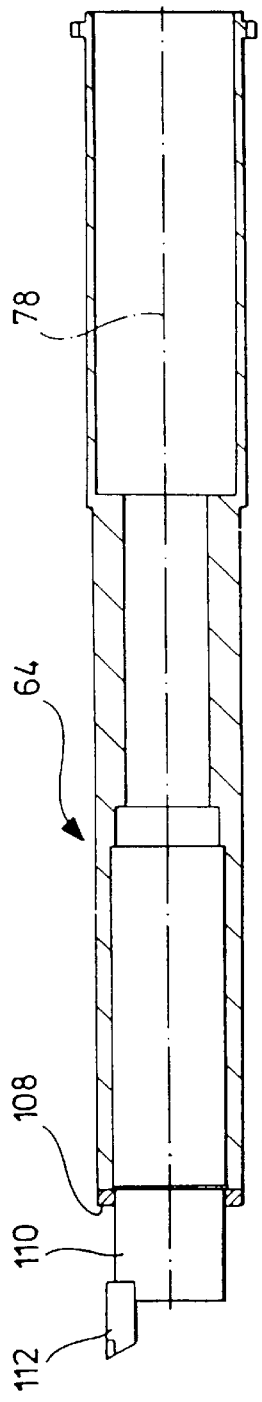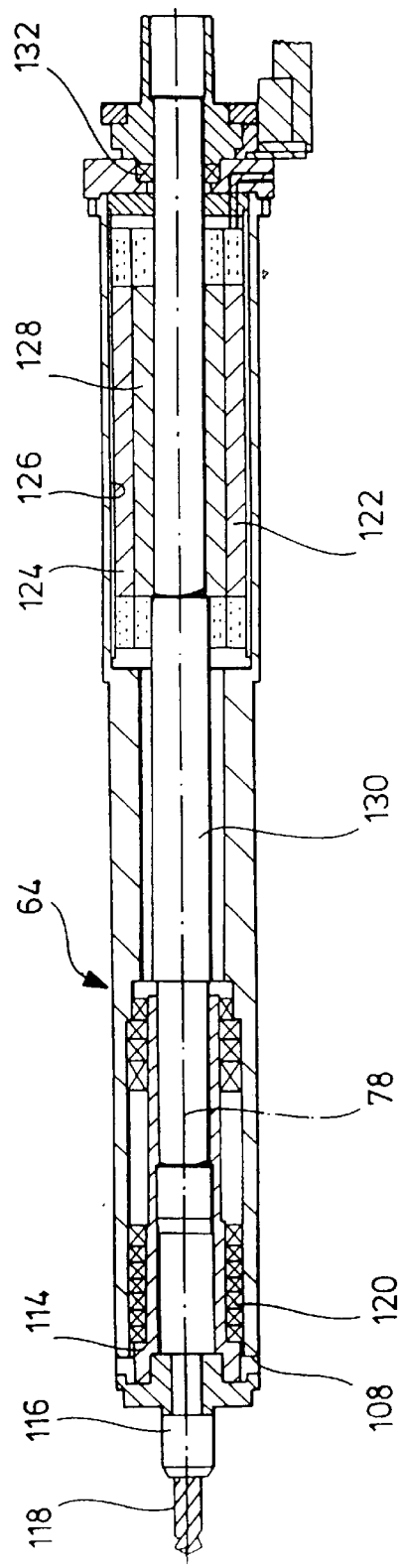

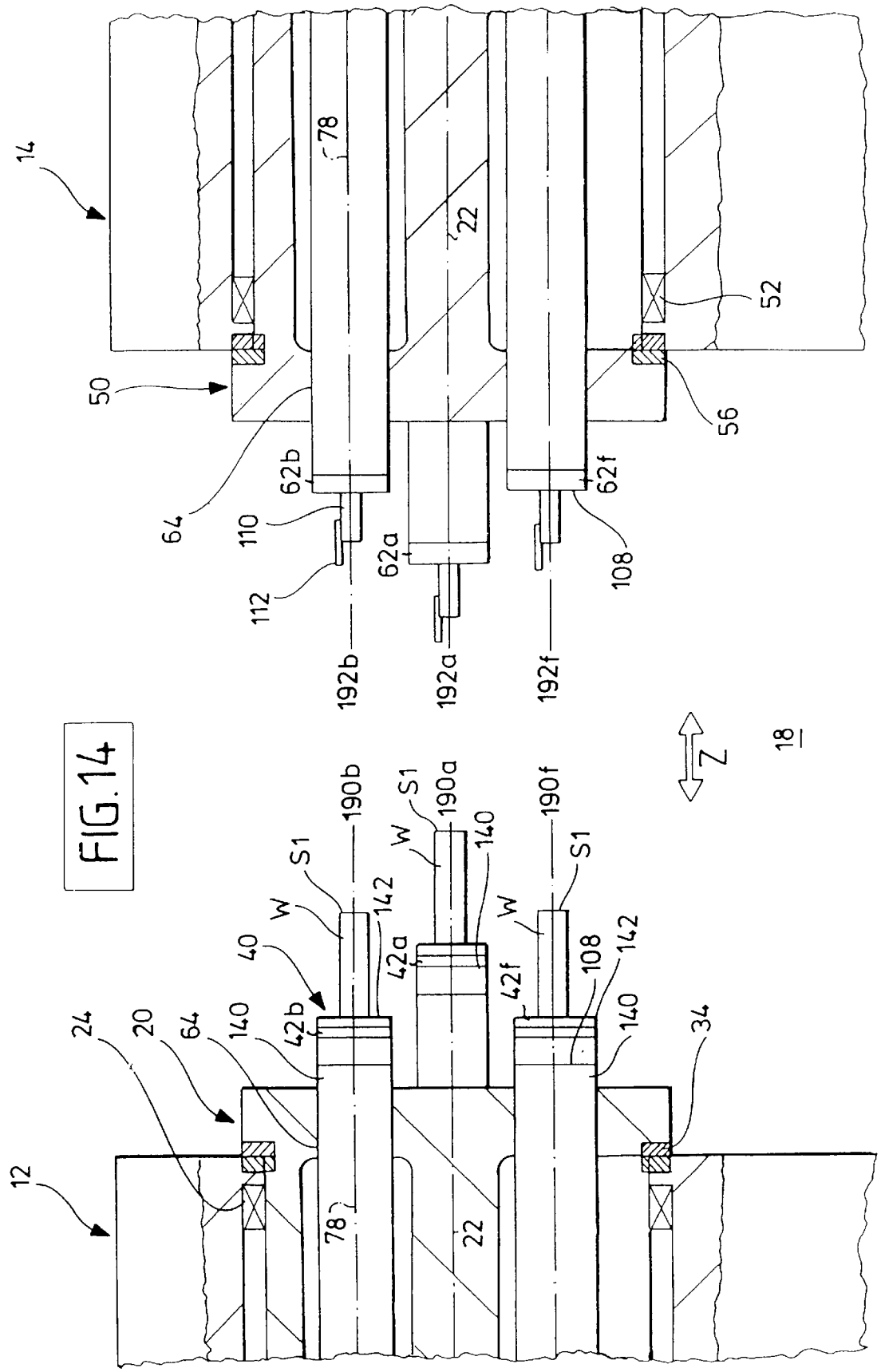

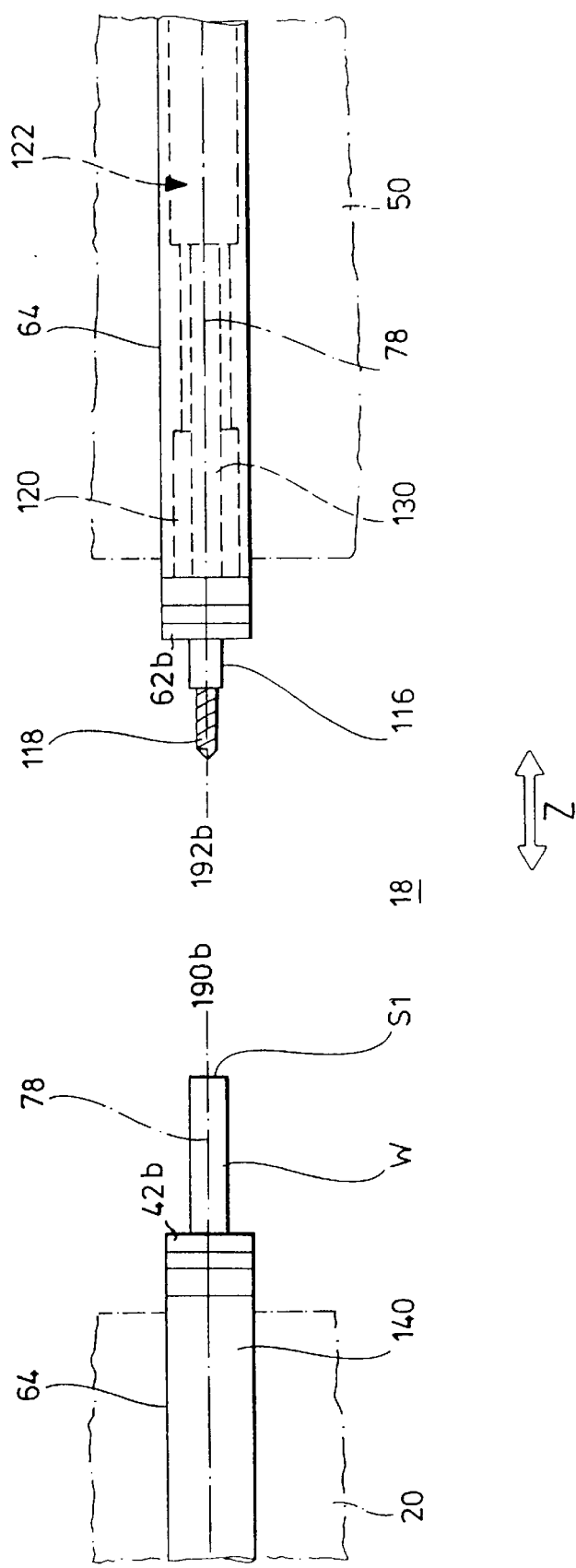

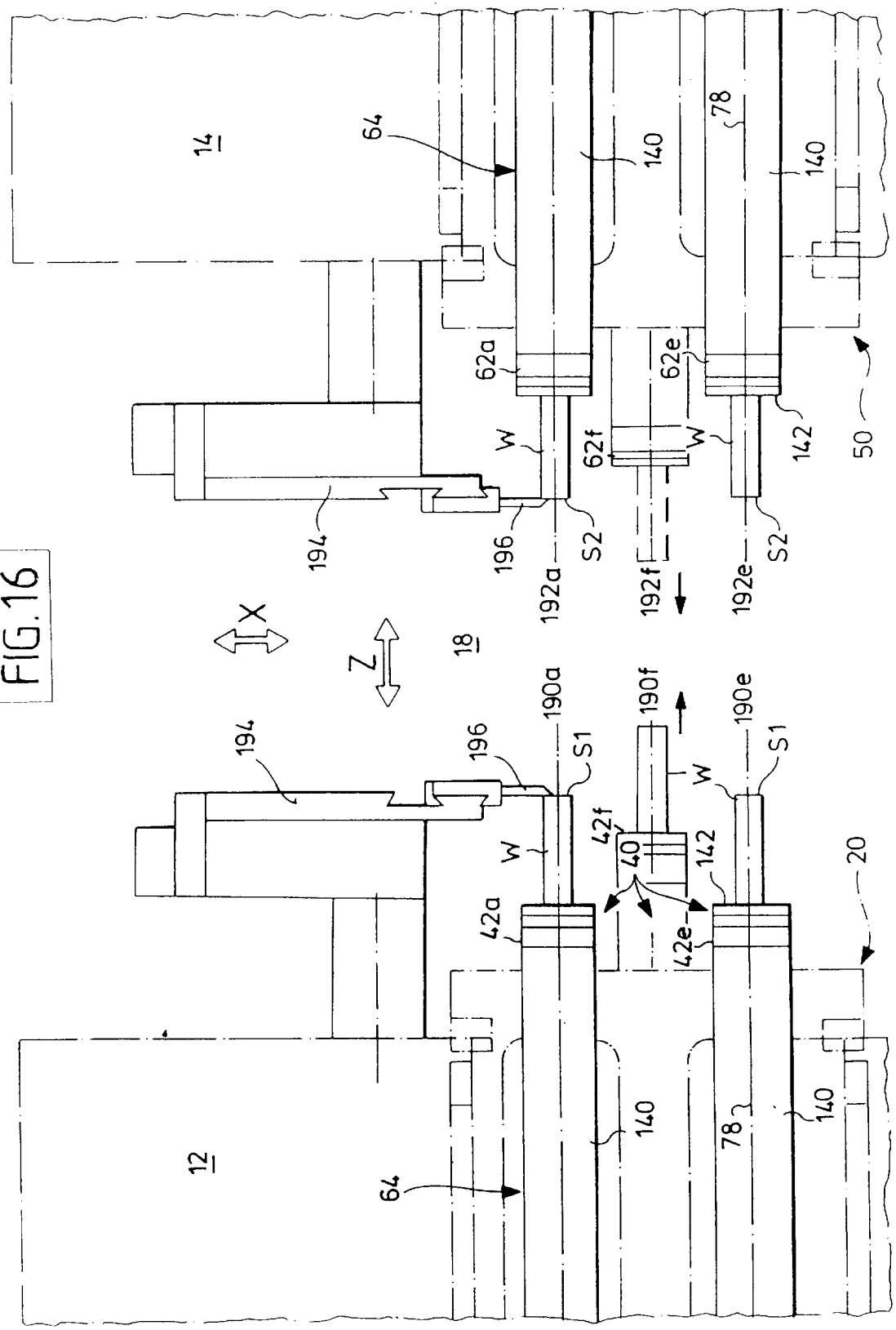

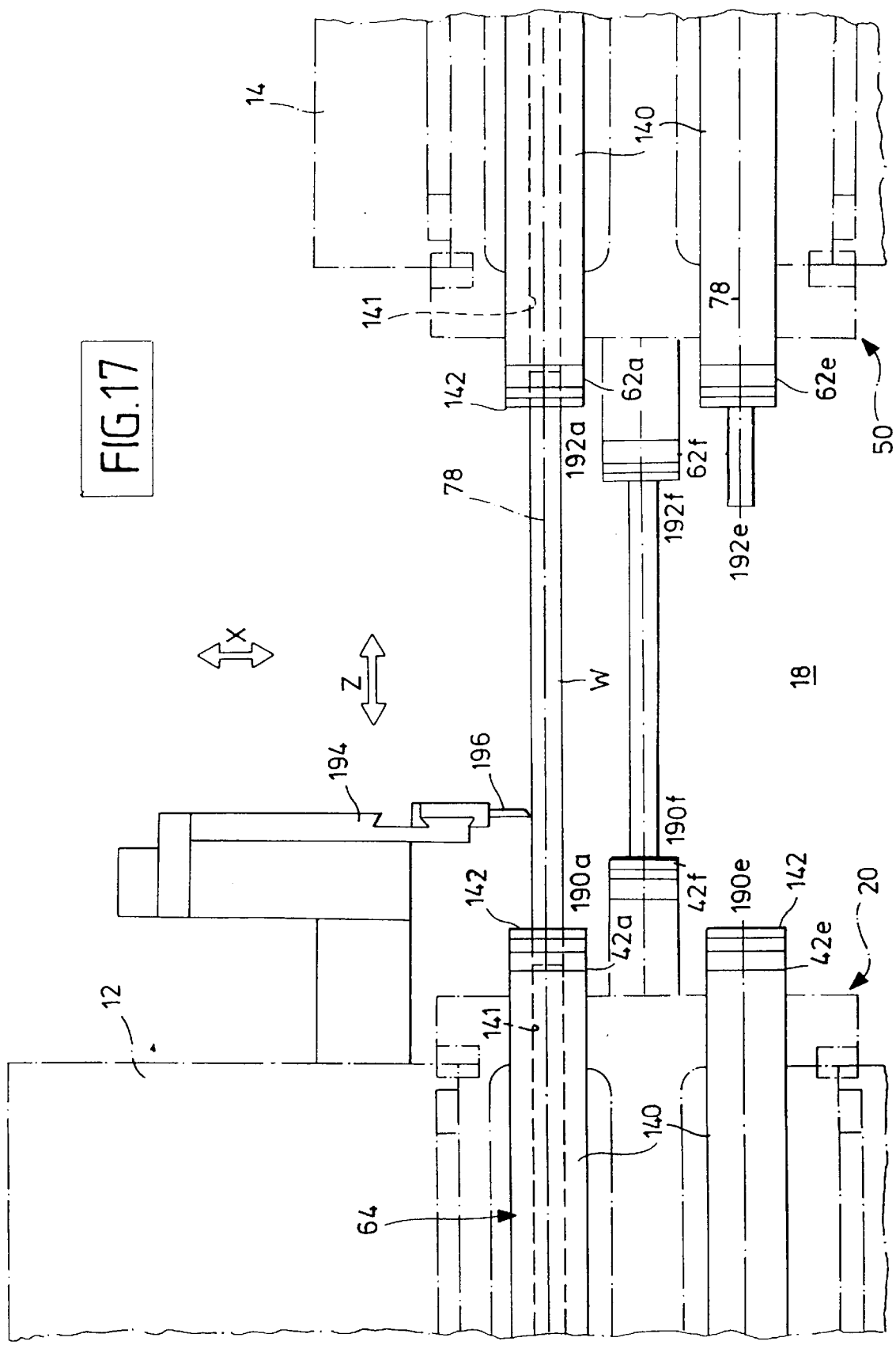

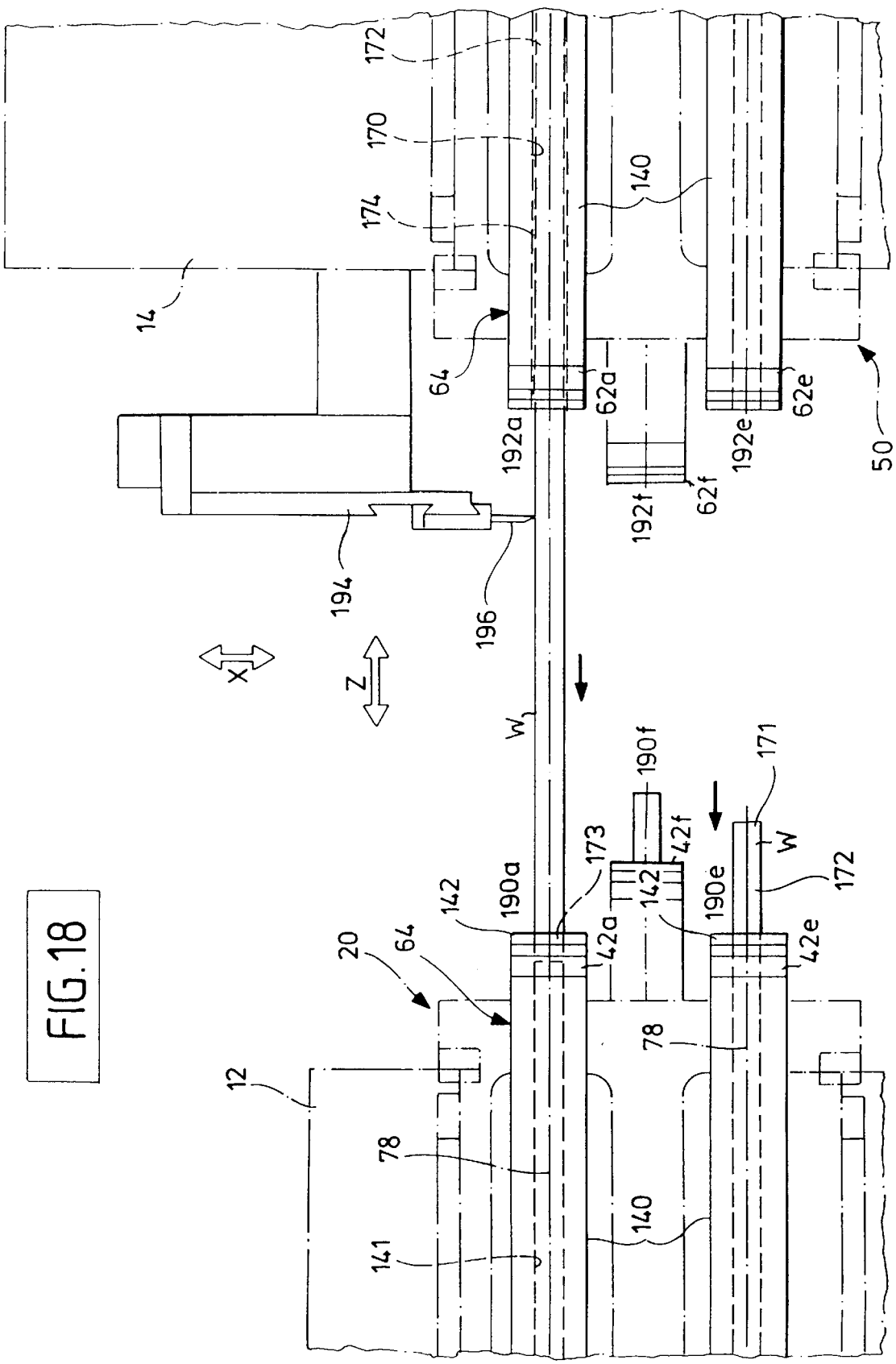

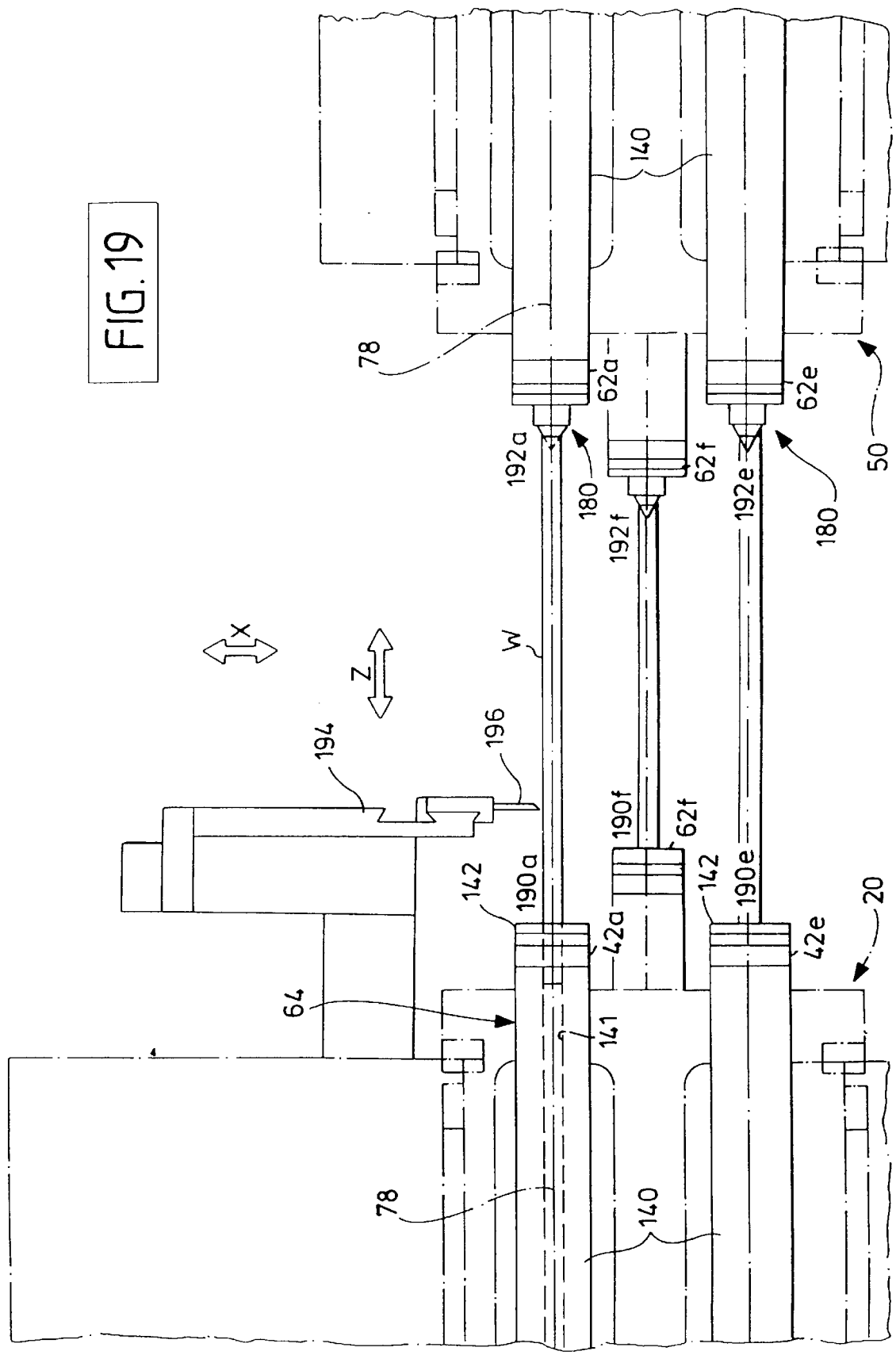

MULTIPLE-SPINDLE TURNING MACHINE

This application is a continuation-in-part of International PCT Application No. PCT/EP96/00537, filed on Feb. 9, 1996.

BACKGROUND OF THE INVENTION

The invention relates to a multiple-spindle turning machine, comprising a machine frame, a cylinder rotatable around an essentially horizontal rotational axis relative to the machine frame, work piece spindles arranged on the cylinder in respective individual positions with spindle axes, which are aligned essentially parallel to the rotational axis and which during the machining of a work piece are movable in the direction of their spindle axis and independently of one another relative to the cylinder by means of linear drives, and tools arranged on tool supports for machining the work pieces held in the work piece spindles.

Such a multiple-spindle turning machine is known from the patent publication DE-OS 25 28 001, this publication disclosing work piece spindles, which are arranged on a cylinder and have disc cams as linear drives, said linear drives being firmly disposed in the machine frame and only acting on the work piece spindles to displace these in the direction of their spindle axes when these stand in the respectively provided spindle stations. Each spindle station has a linear drive allocated to it which acts on the work piece spindle standing in this station for displacement thereof in the direction of its spindle axis.

The disadvantage of such a solution is that exact position of the individual work piece spindles in the direction of their spindle axis is not possible.

Therefore, the object of the invention is to improve a multiple-spindle turning machine of the specified type so that it enables the respective work piece spindle to be positioned as precisely as possible in the direction of its spindle axis.

SUMMARY OF THE INVENTION

This object is achieved according to the invention with a multiple-spindle turning machine of the type described above in that each work piece spindle is allocated its own linear drive disposed on the cylinder to move it in the direction of the spindle axis, and that the work piece spindle is constantly coupled to the linear drive.

Such a solution has the great advantage that all the problems resulting from each work piece spindle in each individual spindle station being driven respectively by another linear drive are henceforth eliminated.

In addition, this solution has the great advantage that all the problems resulting from the connection can be respectively released and re-created between the individual linear drives and the individual work piece spindles are eliminated.

Finally, the solution according to the invention also has the great advantage for reducing piece rates and accelerating the cylinder indexing that there is no necessity, as is the case in DE-OS 25 28 001, to return the work piece spindle into its initial position prior to each cylinder indexing action. With the solution according to the invention, the position of the respective work piece spindle in the direction of its spindle axis may be maintained in principle during cylinder indexing or the new position may be approached so long as there is no risk of collision with the fixed tool.

A particularly advantageous solution of the invention provides that the work piece spindle may be specifically positioned and fixed with respect to its position in the direction of the spindle axis by means of the linear drive. This solution additionally has the advantage over disc cam-controlled linear drives that forces may be absorbed in opposing directions in the direction of the spindle axis and therefore duplicating turning operations are also possible, for example, in which cutting forces occur in both opposing directions.

A particularly advantageous embodiment of such a linear drive provides that this is constructed as a spindle drive and comprises a drive motor sitting on the cylinder, in which case longitudinal positioning of the work piece spindle may be carried out with this drive motor and the spindle drive, which at the same time on its termination constitutes fastening of the work piece spindle.

A particularly advantageous embodiment of a multiple-spindle turning machine according to the invention provides that the work piece spindle may be moved in the direction of its spindle axis by means of a numerically controlled shaft member. Such a numerically controlled shaft member on the one hand has the usual known advantages resulting from the numerical control and additionally has the further advantage that quick motion movements of the work piece spindle may be accomplished simply and in particular may also be accomplished simply independently of the respective other spindles, so that a quick motion movement is already possible in the case of one of the work piece spindles of the cylinder, while in the case of the other work piece spindles the cylinder is still subject to a numerically controlled axial movement during machining.

The linear drive for each work piece spindle could basically be arranged everywhere at any point of the cylinder. For example, it would be possible to arrange the linear drive relative to the rotational axis to lie radially on the inside relative to the respective work piece spindles. However, this would have the disadvantage that the work piece spindles would have to be positioned on the cylinder at a relatively large distance from the rotational axis.

For this reason, a particularly advantageous embodiment provides that the linear drive is arranged on the cylinder to lie radially on the outside relative to the respective work piece spindle.

In order to permit a particularly compact construction of the spindle cylinder, a further advantageous embodiment provides that the linear drive is offset at an angle relative to the work piece spindle so that the linear drive does not stand exactly radially on the outside relative to the respective work piece spindle, but is offset at an angle and can thus again be additionally offset towards the rotational axis.

The construction is particularly compact if a drive motor of the linear drive or the entire linear drive is arranged in an angle range between two consecutive work piece spindles so that use of the space between two work piece spindles can be optimised.

No particular details have been given hitherto with respect to the construction of the work piece spindles themselves. Therefore, it would be possible, for example, to equip the work piece spindles with a flange-mounted spindle motor. However, it is particularly advantageous if the work piece spindle is constructed as a motor spindle, that is a built-in motor is provided in a sleeve receiving the work piece spindle.

No particular details have been given hitherto with respect to the further construction of the multiple-spindle turning machine according to the invention.

Fundamentally, carriages for tools, with which machining of the work pieces held in the work piece spindles is carried out in individual stations, are also arranged on the portion of the machine frame on which the cylinder is mounted, in which case the mobility of the work piece spindles in the direction of their spindle axis is additionally utilised as Z-axis movement during machining of the work piece. However, this does not exclude a likewise provided Z-axis movement of the tool relative to the machine frame.

However, the mobility of the work piece spindle in the direction of its spindle axis may be used particularly advantageously if at least one machining means cooperating with one of the work piece spindles is arranged on the machine frame on a side of the operating area opposite the cylinder, and these machining means can be constructed and used in many different ways to be described later in detail.

The construction and arrangement of the machining means are preferably such that, utilising the mobility of the work piece spindle in the direction of its spindle axis, they cooperate therewith.

The one machining means or more machining means can be arranged in this case to be principally stationary on the machine frame.

However, a particularly advantageous embodiment of the multiple-spindle turning machine according to the invention provides that the machining means is arranged on a support which is rotatable around a rotational axis parallel to the rotational axis of the cylinder, and a particularly compact construction is possible thereby if the support is rotatable coaxially to the cylinder.

Such a machining means arranged on a support rotatable coaxially to the rotational axis of the cylinder offers numerous further advantages in conjunction with the solution according to the invention, since there is the possibility of using one and the same machining means in several stations and not just in one.

This is made possible, for example, by the support being coupled rigidly to the cylinder relative to its rotational movement around the rotational axis so that the machining means allocated to a work piece spindle remains allocated and rotates jointly with the work piece spindle, and it is possible, for example, to move the work piece spindle together with its allocated machining means through all spindle stations. A rigid coupling of the rotational movement of the cylinder and support does not have to be accomplished mechanically, but can also be accomplished by suitable control of separate drives.

However, it is also possible as alternative thereto that the support is rotatable independently of the cylinder. This provides the possibility of rotating the cylinder and the support so that the work piece spindle and the allocated machining means still stand in the same stations respectively, but do not, however, reach these by synchronous movement. However, it is also possible to allocate a machining means to different work piece spindles.

It is particularly advantageous if separate drives are provided respectively to drive the cylinder and the support since as a result the absolutely necessary mechanical connection, which constantly encumbers cuttings when falling and the arrangement of additional, e.g. radially operating, tools, . . .

The provision of a separate drive for the cylinder and the support provides the possibility of using the operating area, in particular its section located between the faces of the cylinder and the support, without any mechanical connections between the cylinder and support and therefore gain further space for the arrangement and movement of tools.

No further details have hitherto been given with respect to the rotating capacity of the cylinder. For example, it would be conceivable—as is usual in the case of conventional multiple-spindle turning machines—to provide the cylinder with a Maltese cross rotary drive which moves the cylinder into individual stations firmly arranged relative to the machine frame, and positions it in them.

However, it is particularly advantageous if the cylinder is rotatably controlled as a numerically controlled shaft member, since such a rotary drive for the cylinder provides the possibility of rotating the cylinder in accordance with specific angular velocity profiles, and in particular also move the work piece spindles from one station to the respective next one or also directly to a station located further away, which is not possible in the conventional positioning of the cylinder using a Maltese cross.

Similarly, it is conceivable in the case of a rotatable support to also rotate this using a Maltese cross rotary drive. However, it is even more advantageous to also construct the support so that it is rotatably controlled as a numerically controlled shaft member, and thus construct the support so that it may be positioned exactly with the rotary drive.

It is particularly advantageous for a plurality of machining operations if the machining means is allocated to one of the work piece spindles during machining of the work piece and may be positioned opposite this relative to the operating area, since with the machining means in this position machining may be carried out undisturbed by the other work piece spindles.

In this case, it has proved to be particularly expedient if the support carries several machining means and each machining means is arranged so that it cooperates with at least one allocated work piece spindle of the cylinder.

This enables multiple machining of the work pieces held in several work piece spindles in particular in a simple manner.

The construction of the machining means may, for example, be such that it can only be allocated to one work piece spindle. However, it is particularly advantageous if the machining means is constructed so that it can be allocated to each work piece spindle of the cylinder, thus rendering flexible machining of work pieces possible.

A particularly advantageous solution in this case provides that during machining of the work piece the machining means is aligned with a central axis coaxially to the spindle axis of the work piece spindle allocated to it, in order in particular to provide the possibility, for example, of holding and guiding a work piece with the work piece spindle on the one hand and on the other with the machining means.

In particular, in all those cases where a work piece must be held or guided by the work piece spindle on the one hand and on the other by the machining means, it is advantageous if the held work piece may be rotated in the machining means around the rotational axis synchronously with the allocated work piece spindle also holding the work piece, so that the work piece may be further rotated while held on both sides.

In the simplest case, the machining means may be displaceably held on the support. However, it is particularly advantageous if the machining means may be moved relative to the support parallel to direction of the rotational axis and independently of the other machining means.

Such mobility of the machining means can be accomplished in a particularly simple manner if each machining means is allocated its own linear drive for movement of same in the direction of the rotational axis.

It is particularly advantageous, in particular so as to be able to position the machining means as precisely as possible and position it exactly in all the rotational positions of the support, if the machining means is constantly coupled to the linear drive.

In order to render unnecessary further means for fixing the machining means in their respective position in a direction parallel to the rotational axis, it is advantageous if the machining means can be specifically positioned and fixed with respect to its position parallel to the direction of the rotational axis by means of the linear drive.

This may be accomplished in the simplest manner if the linear drive is constructed as a spindle drive.

Moreover, it is advantageous, in particular in order to achieve high precision in positioning the machining means, if the machining means is itself solely movable linearly as a whole relative to the support, since such mobility of the entire machining means, which is solely possible in an axial direction, permits precise guidance of same on the support.

It is particularly expedient, in particular to be able to position the machining means exactly on the one hand and on the other hand to be able to move extremely quickly where possible for quick motion movements, if the machining means may be moved in a direction parallel to the rotational axis by means of a numerically controlled shaft member.

It is particularly expedient for cuttings falling during machining and for optimum accessibility of the work piece, in particular also for transfer of the work piece from the cylinder to the support and vice versa, if a machining element of the machining means may be positioned in front of a face of the cylinder or support facing the operating area, and in particular defining this.

It is particularly advantageous here if the machining element stands in front of a face of the cylinder or support to thus ensure that the machining element itself is constantly arranged in the operating area to assure optimum accessibility.

The machining means has not thus far been explained in further detail in association with the embodiments described so far. Hence, a particularly advantageous embodiment provides that the machining means comprises a tool holding fixture.

A particularly advantageous embodiment provides that the machining means comprises a tool holding fixture for a rotating tool.

A further embodiment provides that the machining means comprises a tailstock.

A further advantageous embodiment provides that the machining means comprises a longitudinal turning guide.

A particularly preferred embodiment provides that the machining means is constructed as a work piece spindle, in which case the work piece spindle can either be used for clamping and holding a work piece or also for guiding a work piece during longitudinal turning, and in the latter case the work piece clamping elements serve to guide the work piece, e.g. in the form of a material rod, which may be removed from this work piece spindle and, for example, pulls the opposing work piece spindle.

In this case, the work piece spindles are preferably constructed so that they have a guide channel extending in the axial direction thereof for the material rods.

The work piece spindle itself has not been defined in further detail. A particularly advantageous embodiment provides that the work piece spindle is constructed as a motor spindle.

In the machine according to the invention, it would be possible in principle for both the cylinder and the support to be further constantly rotatable in one direction. In these cases—as is known from the prior art—a Maltese cross rotary drive is provided, for example, which constantly rotates the cylinder or the support so that the work piece spindle or the machining means moves from one station to the next.

However, such a mode of operation has the disadvantage that the control and supply lines leading to the work piece spindles and machining means must be connected via rotary leads to these which cause problems, in particular in the transfer of digital data.

For this reason, an advantageous embodiment of the solution according to the invention provides that the cylinder and/or the support may be rotated from an initial position about a maximum angle into an end position and from this back again into the initial position, and that between the machine frame and the cylinder or support a flexible supply strand is arranged which is firmly connected on the end side to the machine frame at one end and to the cylinder or support at the other and through its flexibility of rotational movement follows around the maximum angle.

This solution has the great advantage that a fixed connection with all the work piece spindles or machining means arranged on the cylinder or support is possible, and therefore it is also possible to actuate these during the rotary movement of the cylinder or support, for example, and also supply them with driving power in order to reduce the piece rates. As a result, for example, as early as during the rotation of the cylinder, a work piece spindle may also be accelerated to a specific rotational speed or be braked from a specific rotational speed to another, or there is the possibility of moving the work piece spindle from a position required in the previous station in a direction parallel to the rotational axis into another position necessary in the next station, or also move it, for example, so as to avoid a collision with a stationary tool. This also applies to the machining means.

Further features and advantages of the invention are the subject of the following description as well as of drawings of some embodiments.

BRIEF DESCRIPTION OF THE DRAWINGS

FIG. 6 is an enlarged representation of a first embodiment of a machining means according to the invention;

FIG. 7 is an enlarged representation of a second embodiment of a machining means according to the invention;

FIG. 14 is a sectional schematic representation of a machining operation of a work piece in a first version of the multiple-spindle turning machine;

FIG. 15 is a sectional schematic representation of a machining operation of a work piece in a second version of the multiple-spindle turning machine;

FIG. 16 is a sectional schematic representation of a machining operation of a work piece in a third version of the multiple-spindle turning machine;

FIG. 17 is a sectional schematic representation of a machining operation of a work piece in a fourth version of the multiple-spindle turning machine;

FIG. 18 is a sectional schematic representation of a machining operation of a work piece in a fifth version of the multiple-spindle turning machine; and FIG. 19 is a sectional schematic representation of a machining operation of a work piece in a sixth version of the multiple-spindle turning machine.

DETAILED DESCRIPTION OF THE INVENTION

Figure 1:
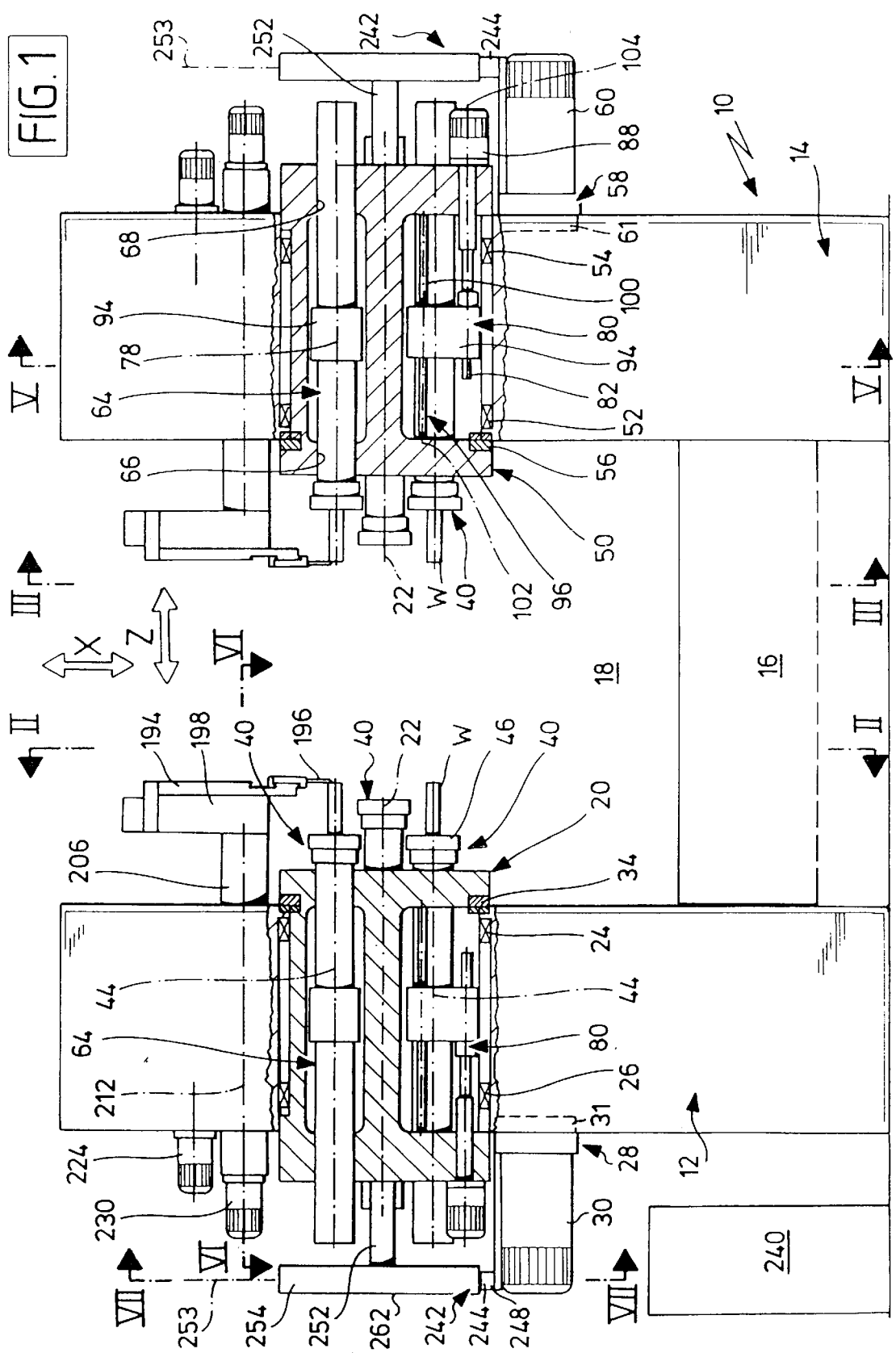
FIG. 1 shows a side view of a multiple-spindle turning machine in partial section taken along line I—I in FIGS. 2 and 3 with machining means shown, for example, in the form of work piece spindles.

An embodiment of a multiple-spindle turning machine according to the invention, shown in FIG. 1, has a machine frame given the overall reference 10, comprising a first stand 12 and a second stand 14, which are connected to one another by means of a base part 16. An operating area given the overall reference 18 is located between the stands 12, 14.

A first cylinder, given the overall reference 20, with a front cylinder bearing 24 facing the operating area 18 and a rear cylinder bearing 26 on a side of the first stand 12 facing away from the operating area 18, is mounted in the first stand 12 to rotate around a horizontal rotational axis 22. A rotary drive, given the overall reference 28, comprising a drive motor 30 and a toothed belt transmission 31, for example, with which the cylinder 20 may be driven in the region of the rear cylinder bearing 26, is provided to rotate the cylinder 20. In this case, the rotary drive 26 is preferably constructed as a numerically controlled rotational shaft member, with which the cylinder 20 may be positioned precisely in any rotational position.

On the side of the first stand 12 facing the operating area 18, a three-part serration 34 active between the first stand and the cylinder 20 is provided to fix the individual rotational positions of the cylinder 20, and said serration is located between the front cylinder bearing 24 and the operating area 18 and may be operated hydraulically.

Figure 2:
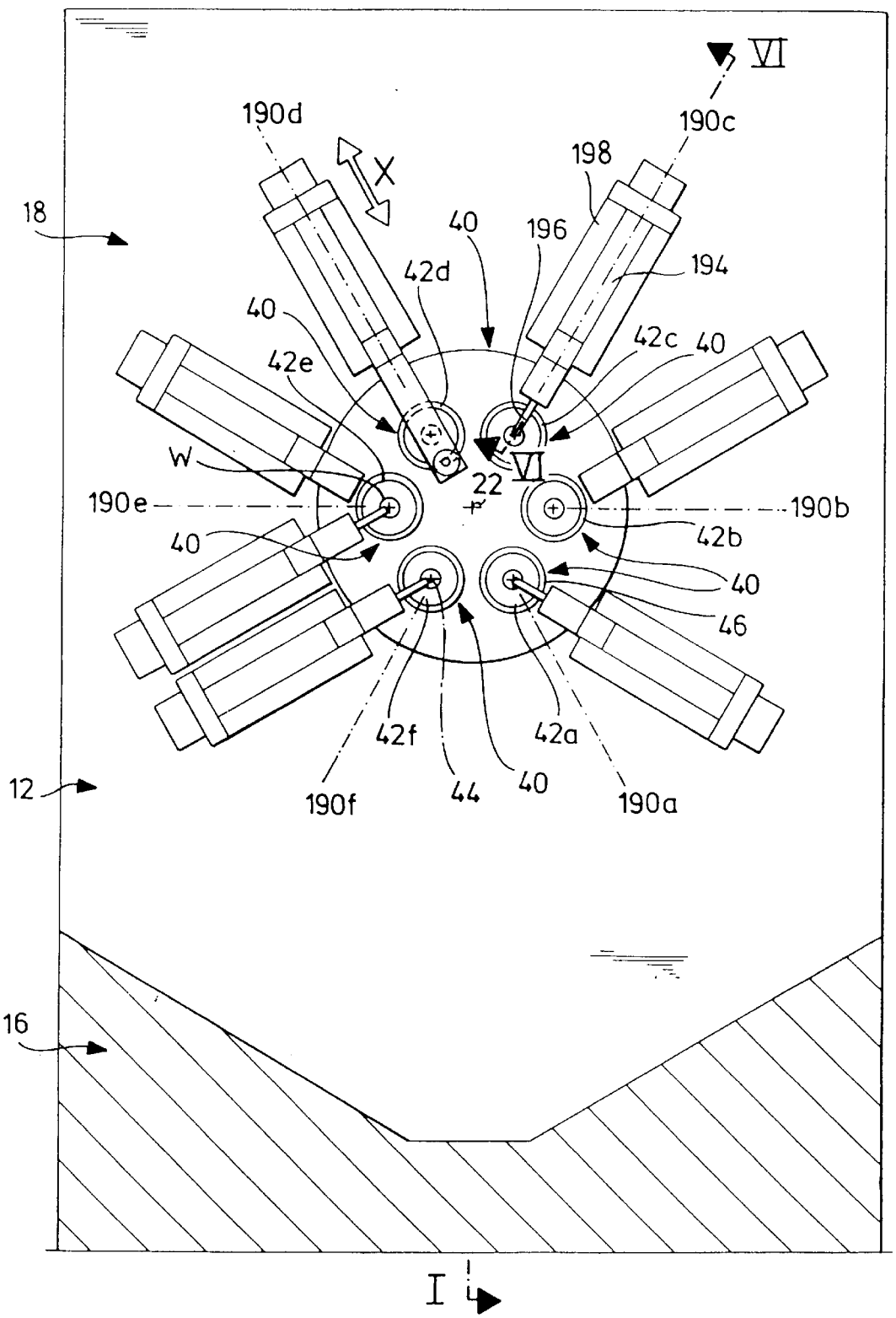
FIG. 2 is a section taken along line II—II in FIG. 1.

As shown in FIGS. 1 and 2, a plurality of first machining means 40, e.g. constructed as work piece spindles, are arranged on the cylinder 20 in individual positions 42a, 42b, 42c, 42d, 42e and 42f, in which case the machining means 40 are at the same radial distance from the rotational axis 22 in each of the positions 42a and all positions lie at the same angle distance around the rotational axis 22.

All the machining means 40, moreover, extend with their central axis 44 parallel to the rotational axis 22 and therefore also extend in horizontal direction, and are arranged in such a way that a machining element 46, e.g. a work piece chuck, enclosed by the machining means 40 faces the operating area 18 so that a work piece W clamped therein can be machined in the operating area 18.

In the second stand 14, a second cylinder 50, which is mounted to rotate coaxially to the rotational axis 22 in the second stand 14 by a front cylinder bearing 52 facing the operating area 18 and a rear cylinder bearing 54 on a side of the second stand 14 facing away from the operating area 18, is arranged as a support for further machining means 40. In this case, a rotary drive 58 with a drive motor 60 and a toothed belt transmission 61, which drives the second cylinder 50 in the region of the rear cylinder bearing 54, is provided to rotate the second cylinder 50. The rotary drive 58 is preferably also constructed as a numerically controlled rotational axis so that the cylinder 50 may be exactly positioned in any desired rotational position.

On the side of the second stand 14 facing the operating area 18, a three-part serration 56 active between the second stand and the counter-cylinder 50 is provided to fix the individual rotational positions of the cylinder 50, and said serration is located between the front cylinder bearing 52 and the operating area 18 and may be operated hydraulically.

Figure 3:
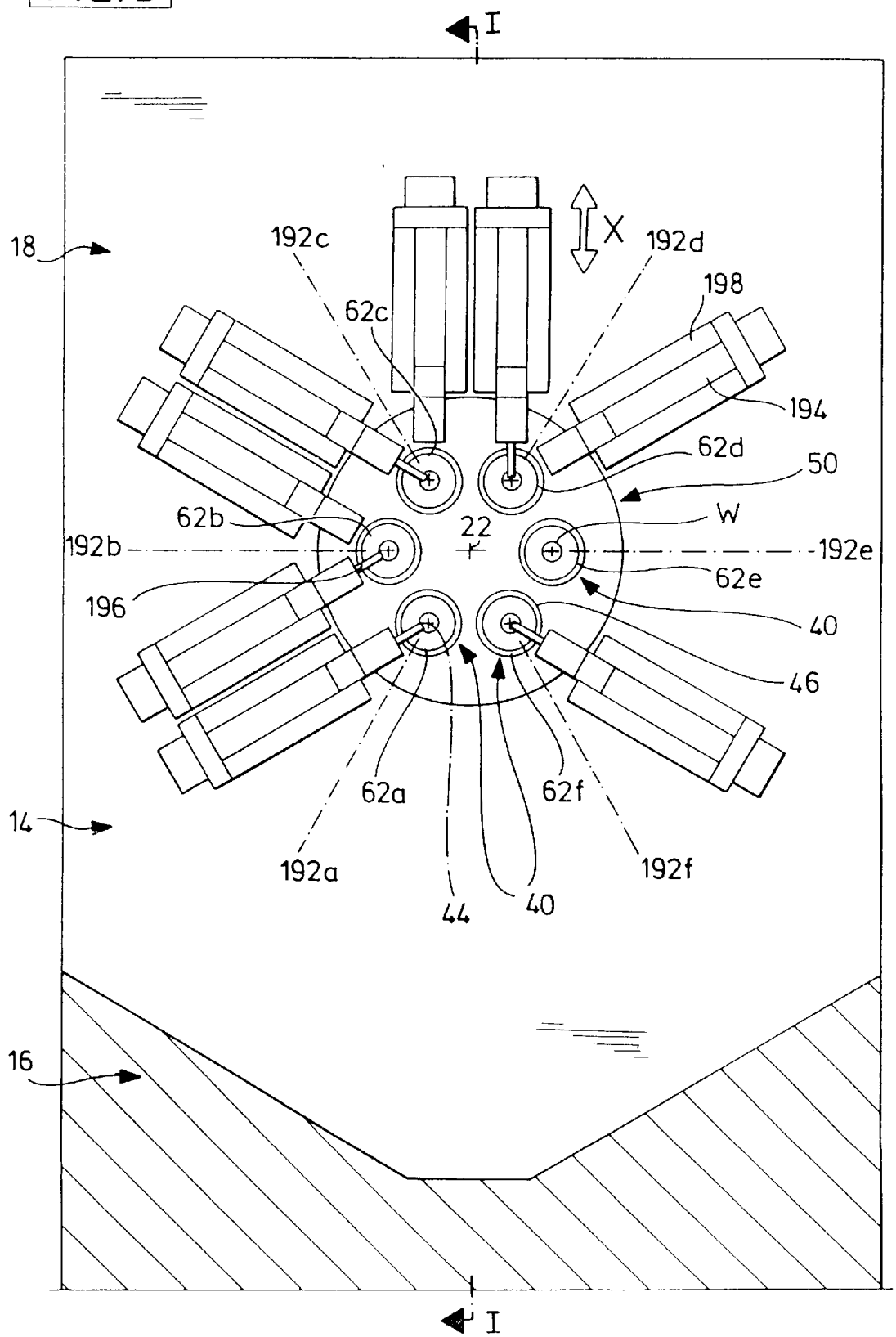
FIG. 3 is a section taken along line III—III in FIG. 1.

As shown in FIG. 3, six positions 62a to f are provided in the second cylinder, in which case the individual positions 62a to f are arranged at the same radial distance from the rotational axis 22 and, for example, at the same angle distance relative to one another as positions 42a to f. Machining means 40 with central axes 44, which are aligned parallel to the rotational axis 22 and may be of a wide variety of types, are arranged in these positions 62a to f.

Each of the machining means 40 is arranged in a sleeve 64, and said sleeve 64 passes through guide openings 66 and 68 in a front bearing plate 70 or a rear bearing plate 72 of the first cylinder 20 or the second cylinder 50 and is either firmly installed in the guide openings 66 and 68 or is guided displaceably parallel to the rotational axis 22 by means of linear guides 74 and 76 in the direction of the central axis 78, which coincides with the central axis 44 of the machining means 40.

Figure 4:
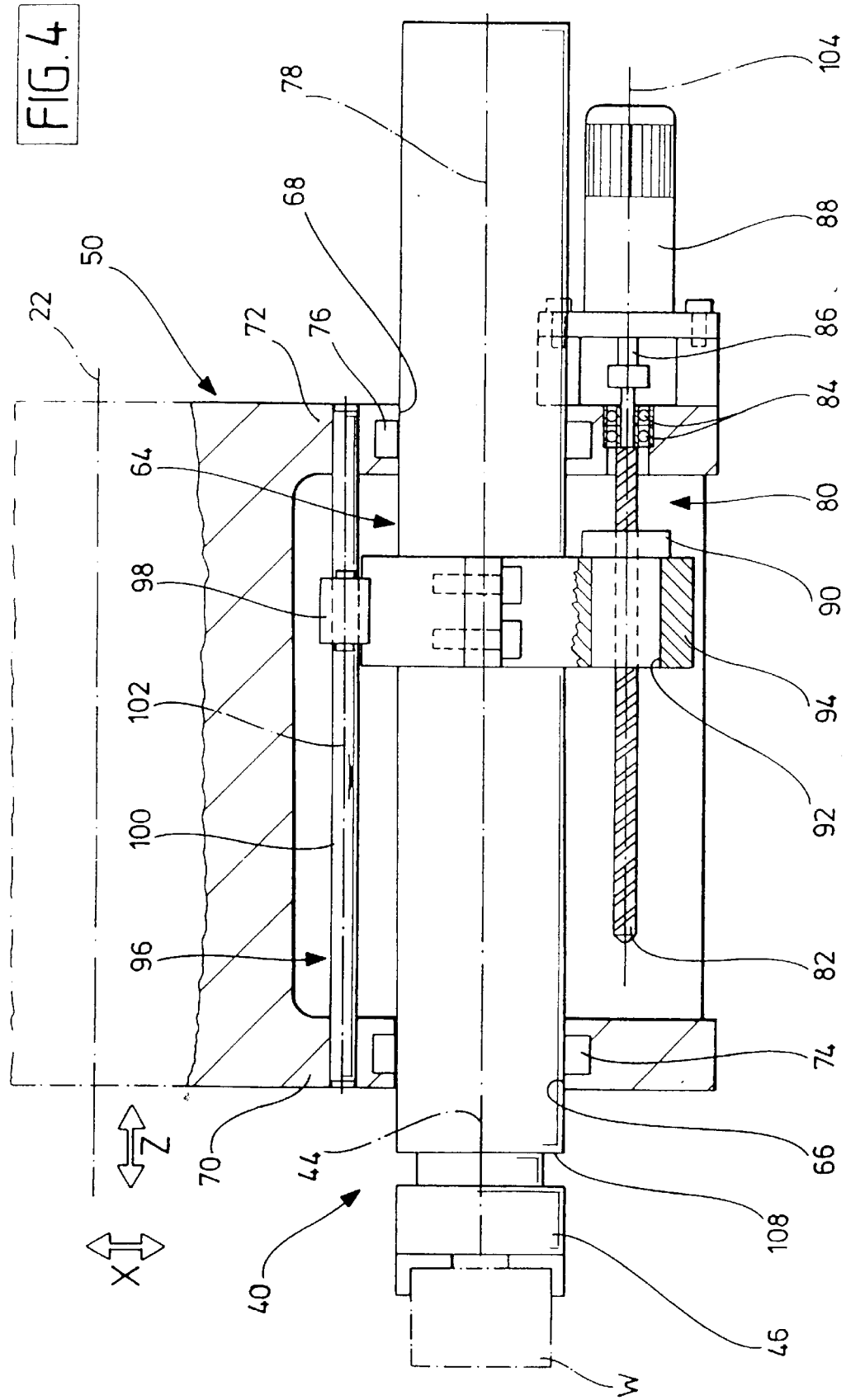
FIG. 4 is a sectional representation enlarged in some sections through a cylinder in FIG. 1.

For defined displacement of the sleeve 64 relative to the cylinder 20 and/or cylinder 50, a linear drive, given the overall reference 80 in FIG. 4, is provided which comprises a ball screw spindle 82, which extends between the bearing plates 70 and 72 and which is mounted on the rear bearing plate 72 with an axial and radial bearing 84 and is directly connected to a motor shaft 86 of a drive motor 88, which is arranged on a side of the rear bearing plate 72 facing away from the front bearing plate 70 and held on this rear bearing plate. The ball screw spindle 82 itself passes through a ball screw nut 90 arranged in a passage 92 of the arm 94 which itself engages around the sleeve 64 on its outside and is immovably fixed to this. The arm 94 is preferably guided on a side opposite the linear drive 80 in a longitudinal guide, given the overall reference 96, which has a guide body 98, which itself slides on a guide bar 100, and said guide bar 100 extends with its longitudinal axis 102 parallel to the central axis 78 of the sleeve 64 and parallel to the rotational axis 22 and is held in the front and rear bearing plate 70 and 72 of the counter-cylinder 50. The longitudinal guide 96 in this case serves to guide the sleeve 64 on the counter-cylinder 50 so that it is rotationally fixed while being longitudinally displaceable in the direction of the central axis 78.

Figure 5:
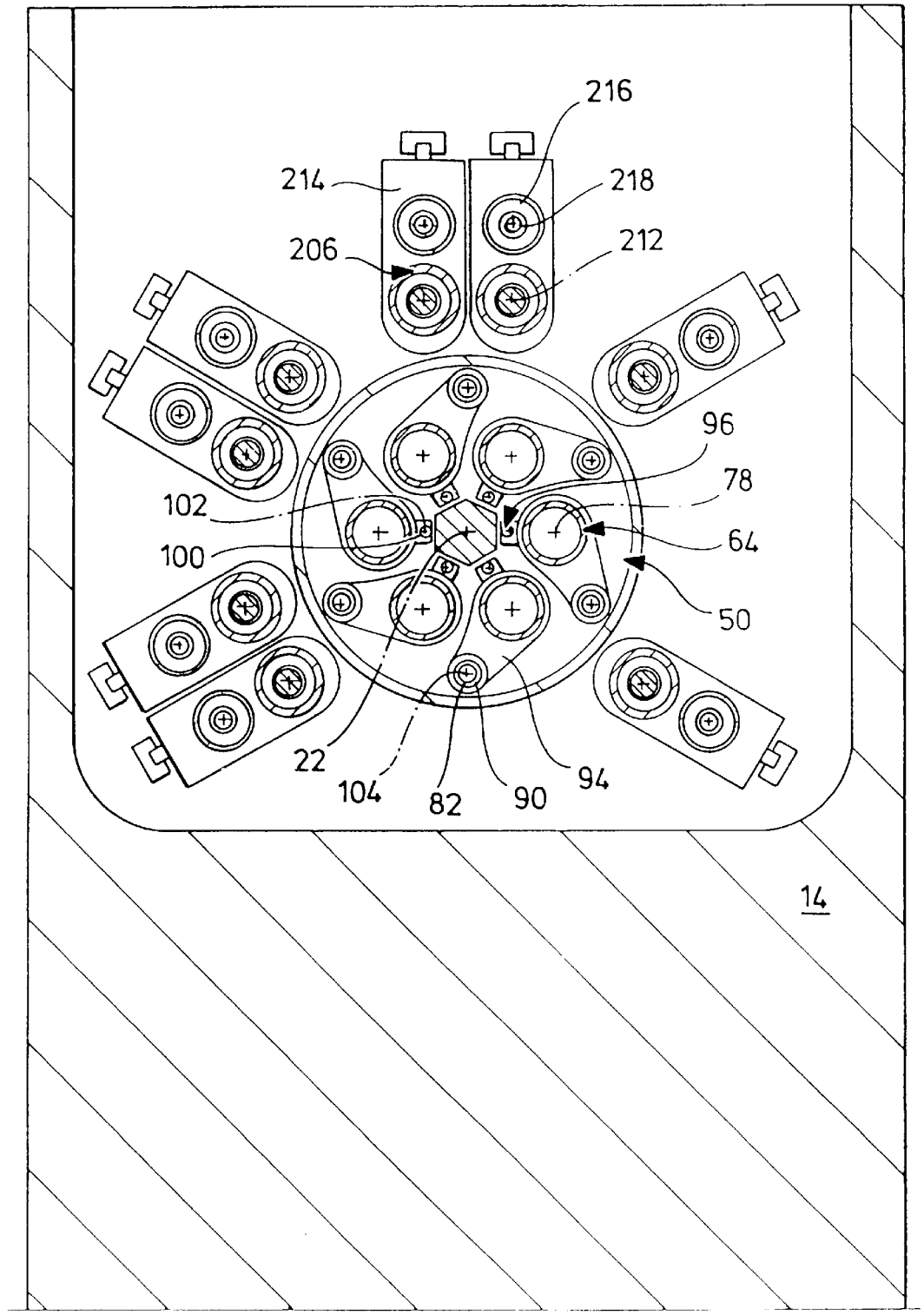
FIG. 5 is a section taken along line V—V in FIG. 1.

As shown in FIG. 5, the linear drive 80 is preferably arranged so that a longitudinal axis 104 is disposed centrally in an angle range between the central axes 78 of two consecutive sleeves 64, and preferably staggered in relation to these two sleeves 64.

The longitudinal guide 96 is preferably arranged on a side of the respective sleeve 64 facing the rotational axis 22, as is also shown in FIG. 5.

The machining means 40 can be constructed in a wide variety of ways. For example, a simple tool 112, which is firmly anchored in the sleeve 64 by a tool holder 110 and which is movable towards the work piece in the opposite machining means 40 constructed in the form of a work piece spindle, for example, in a sleeve 64—as shown in FIG. 6—in which case the rotational position of the tool 112 relative to the central axis 78 is clearly fixed by the rotatably fixed positioning of the sleeve 64 in the cylinder 50.

A second possibility of a machining means according to the invention, shown in FIG. 7, comprises a tool holding fixture 114, which is rotatably arranged in the sleeve 64 and into which a holder 116 of a rotating tool 118 may be inserted, said rotating tool 118 being constructed, for example, as a milling cutter.

This tool holding fixture 114 is mounted in the sleeve 64 via rotary bearings 120 to rotate around the central axis 78 and may be driven by a built-in motor 122 which is received in a region of the sleeve 64 opposite the tool holding fixture 114. In this case, a stator 124 of the built-in motor is firmly anchored in an end recess 126 of the sleeve 64, while a rotor 128 sits on a driving shaft 130 which is rotatably mounted on the one hand on a side above the rotary bearing 120 of the tool holding fixture 114 and on the other. side above an end rotary bearing 132 in the region of the end opposite the tool holding fixture 114. The driving shaft 130 in this case drives the tool holding fixture 114 which is firmly connected to it.

By displacing the sleeve 64 along its central axis 78, the rotating tool 118 may, for example, be moved towards the work piece W held in the opposite machining means 40 constructed as a work piece spindle, and at the same time this tool 118 may be driven to rotate by the built-in motor 122.

Figure 8:
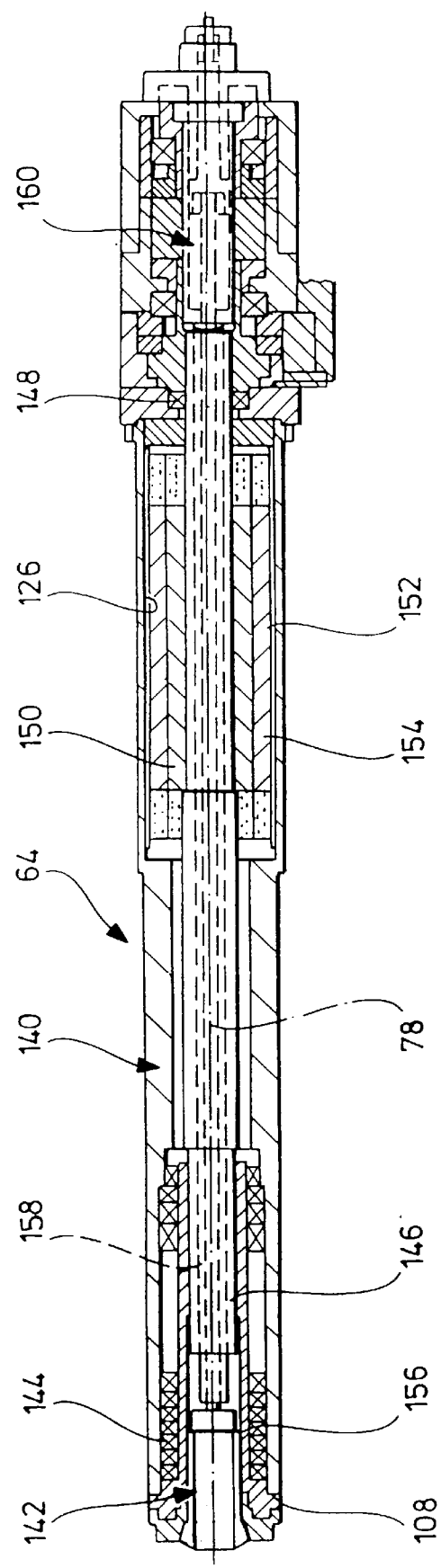
FIG. 8 is an enlarged representation of a third embodiment of a machining means according to the invention.

In a third embodiment of a machining means according to the invention, shown in FIG. 8, a work piece spindle given the overall reference 140 is arranged in the sleeve 64. This work piece spindle 140 comprises a work piece clamping element, given the overall reference 142, which is arranged in the sleeve 64 on the front side 108 thereof facing the operating area 18 and is rotatably mounted in the sleeve 64 by means of a rotary bearing 144.

In this case, the work piece clamping element 142 sits on a spindle tube 146 which passes through the entire sleeve 64 and on the rear side is likewise rotatably mounted via a rotary bearing 148 thereon, and in this case is rotatable coaxially to the central axis 78 as rotational axis. A rotor 150 of a built-in motor given the overall reference 152, sits on the spindle tube 146, and a stator 154 is in this case firmly arranged in the rear recess 126 of the sleeve 64.

To operate a collet chuck 156 of the work piece clamping element, for example, a clamping tube 158 extends from this inside the spindle tube 146 and leads to a hydraulic clamping cylinder 160, which is arranged on the opposite side of the sleeve 64 to the work piece chuck 142 so that the collet chuck 156 may be operated by the hydraulic clamping cylinder 160 via the clamping tube 158 in the usual manner.

The work piece spindle 140 inserted in the sleeve 64 may in this case be moved towards and away from the work piece W by moving the sleeve 64 in the direction of its central axis 78 towards the work piece W arranged in the opposite machining means, e.g. a work piece spindle.

Figure 9:
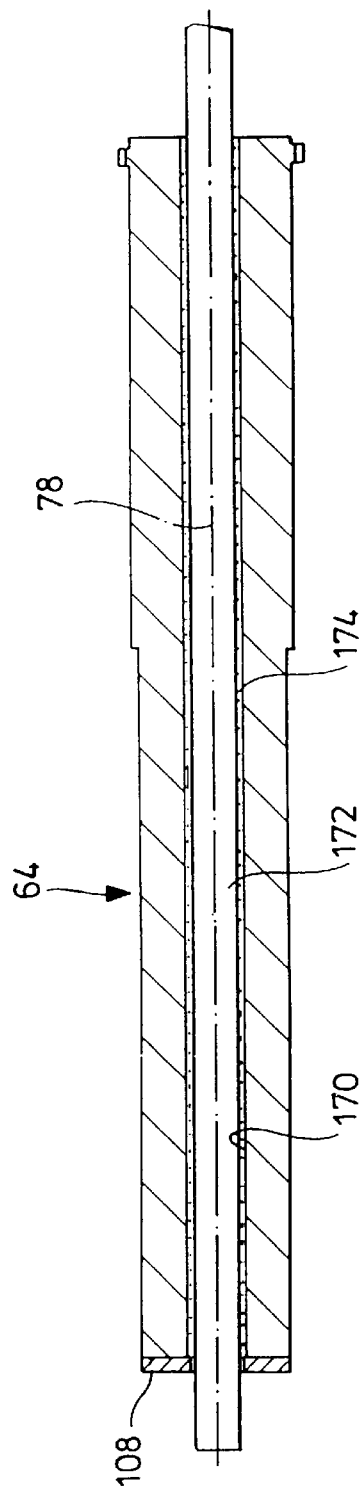
FIG. 9 is an enlarged representation of a fourth embodiment of a machining means according to the invention.

In a further embodiment of a machining means according to the invention, a guide 170 for a material rod 172 is provided in the sleeve 64, as shown in FIG. 9, and said guide 170 is formed, for example, by a guide bush, which extends through the sleeve 64 and in which the material rod 172 is rotatably guided by means of an oil film 174 and is displaceably guided in the direction of the central axis 78 coaxially to the central axis 78. Such a guide 170 provides the possibility of carrying out a longitudinal turning operation in combination with the opposite work piece spindle 46, and in this case the opposite work machining means 40 is constructed as a work piece spindle, and in the same manner as described in association with the work piece spindle 140, must be mounted in the spindle support 20 to be displaceable in the direction of its spindle axis.

Figure 10:
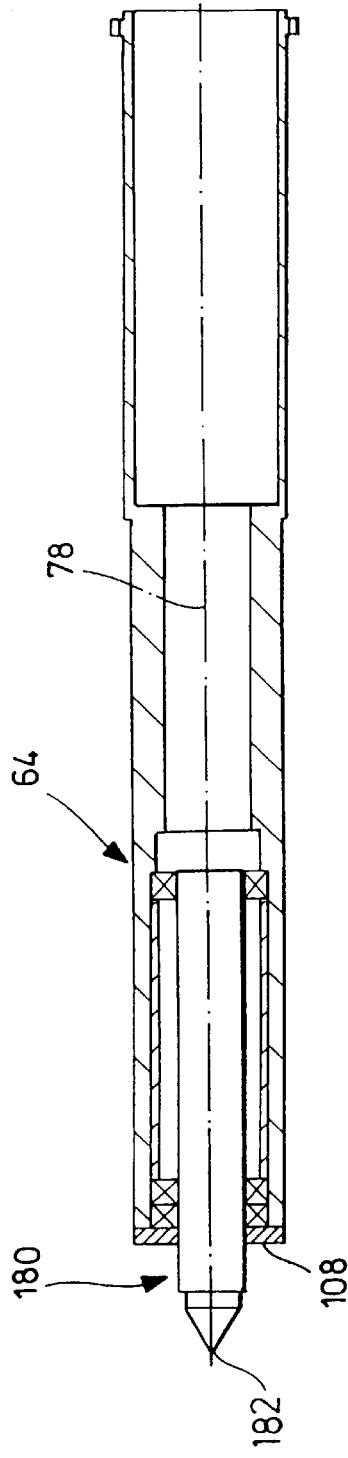
FIG. 10 is an enlarged representation of a fifth embodiment of a machining means according to the invention.

In a further embodiment of a machining means according to the invention, shown in FIG. 10, a tailstock 180 with tip 182 is provided in the sleeve 64.

Figure 11:
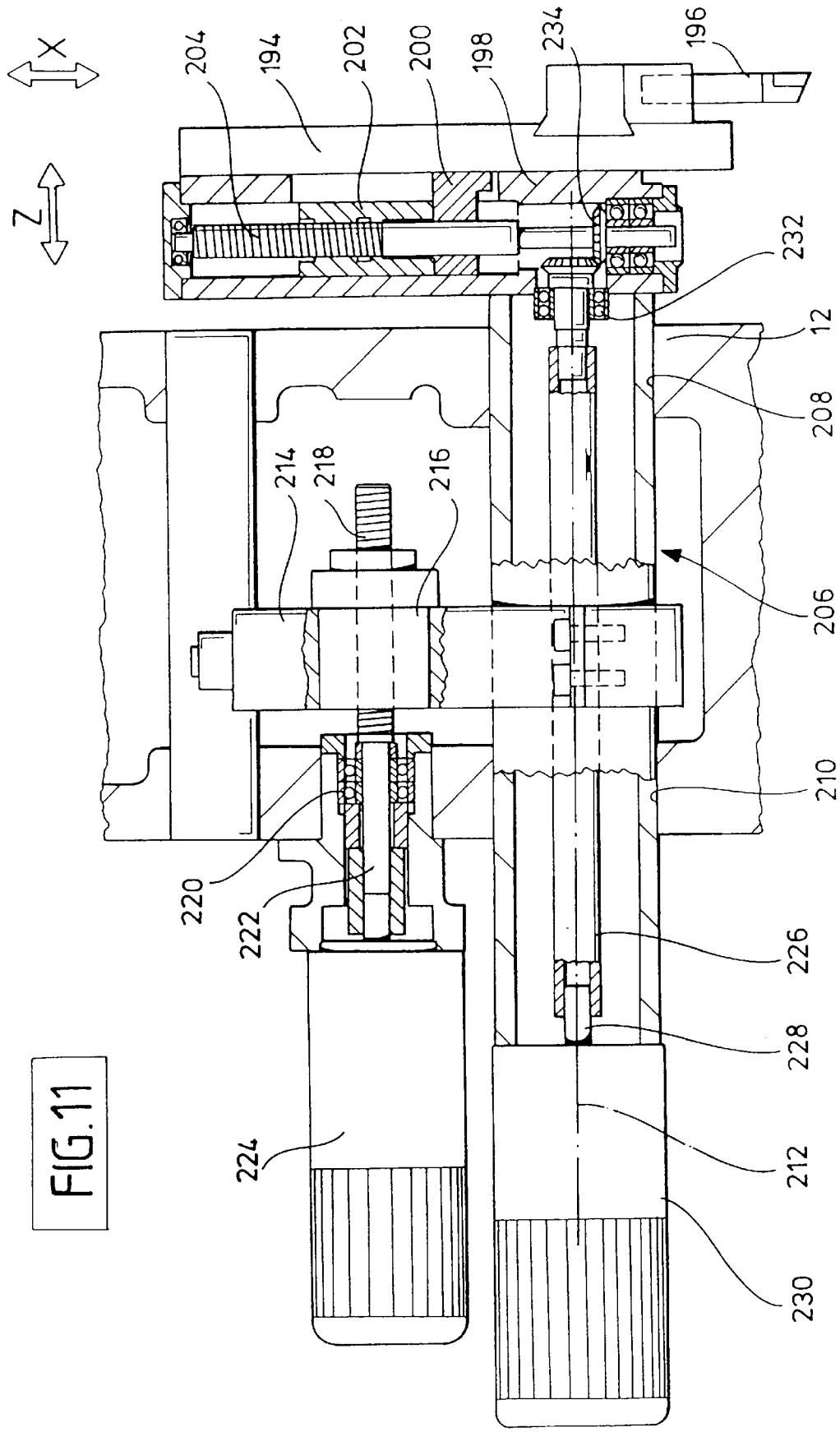
FIG. 11 is an enlarged sectional representation of a section through a tool carriage taken along line VI—VI in FIG. 2, for example.

In the shown embodiment, the machining means 40 arranged in the positions 42*a* to 42*f* and 62*a* to *f* may be positioned in different stations 190*a* to *f* and 192*a* to *f* fixed relative to the stands 12 and 14 by rotating the support 20 or 50. At the two stands 12 and 14, tool carriages 190, which are movable overall in the direction of the X- and Z-axis relative to the stands 12, 14, are allocated to one or more of the stations 192, into which the machining means 40 may be moved, and machining tools 196 are mounted on said carriages, as shown in FIGS. 1 and 11.

In this case, the tool carriage 194 sits on a carriage guide, given the overall reference 198, and is displaceable thereon transversely to the rotational axis 22 and thus also transversely to the central axes 78 of the sleeves 64, and preferably perpendicular thereto, in the direction of the X-axis. For the defined positioning of the carriage 194, it bears a mounting 200 for a ball thread nut 202 which has a ball thread spindle 204 passing through it. The ball thread spindle 204 in this case is rotatably mounted on the end side in the carriage guide 198 and so as to be axially immovable.

The entire carriage guide 198 is movable in the direction of the Z-axis and itself sits on a Z-sleeve 206, which passes through the respective stand 12 or 14 and is displaceably mounted in guides 208 and 210 of the respective stand 12 or 14 in the direction of its central axis 212 parallel to the rotational axis 22 or to the central axes 78.

For displacement of the Z-sleeve 206, this is engaged by a holder 214 bearing a ball thread nut 216, which is arranged next to the Z-sleeve 206 and which itself has a ball thread spindle 218 passing through it, in this case this ball thread spindle 218 extends inside the respective stand 12 or 14 and is aligned parallel to the central axis 212. The ball thread spindle 218 is, for example, rotatably mounted at one end in the respective stand 12, 14 by means of a rotary bearing 220 and is connected to a driving shaft 222 of a feed motor, given the overall reference 224, which protrudes on one side of the stand 12 or 14 opposite the carriage guide 198 and is held thereon.

For driving the ball thread spindle 204, a driving shaft 226, which is connected to a motor shaft 228 of a feed motor 230 and extends as far as the ball thread spindle 204, passes through the Z-sleeve 206. In this case, the driving shaft 226 is rotatably mounted on the end side of the Z-sleeve 206 in a rotary bearing 232 and is connected with respect to drive via a mitre gear 234 to the ball thread spindle 204.

Therefore, the ball thread spindle 204 is rotatable by means of the feed motor 230 and thus the transverse carriage 194 is displaceable transversely to the respective spindle axis 44 or central axis 78, while the entire Z-sleeve 206 is displaceable parallel to its central axis 212, and thus also parallel to the spindle axes 44 of the central axes 78, by the feed motor 224.

For actuation of the rotary drives 28 and 58 of the tool 196 movable in the direction of the X- and Z-axis in the individual stations 190 and 192, as well as of the machining means 40 in the individual positions 42 and 62, a machine control means, given the overall reference 240, is provided (FIG. 1).

A connection between the machine control means 240 and the machining means 40 arranged on the cylinders 20 and/or 50 is made in the case of each of the cylinders 20 and/or 50 through a supply connection 242 arranged on a side of the respective stand 12 or 14 facing away from the operating area between the machine frame 10 and the respective cylinder 20 or 50, which comprises a supply strand 244 guided in a link chain 246, in which case the supply strand 244 at one end 248 is arranged firmly on the machine frame 10 on the rear side of the respective stand 12 or 14, and at the other end is firmly connected to a tube 252 protruding over the respective cylinder 20 or 50 on the respective side opposite the operating area 18, and the supply strand 244 thereby runs in a spiral shape between the two ends 248 and 250 in a plane 253 running perpendicular to the rotational axis 22. In addition, the tube 252 is also surrounded by a worm casing 254, out of which the supply strand 244 is directed through an opening 256.

Figure 12:
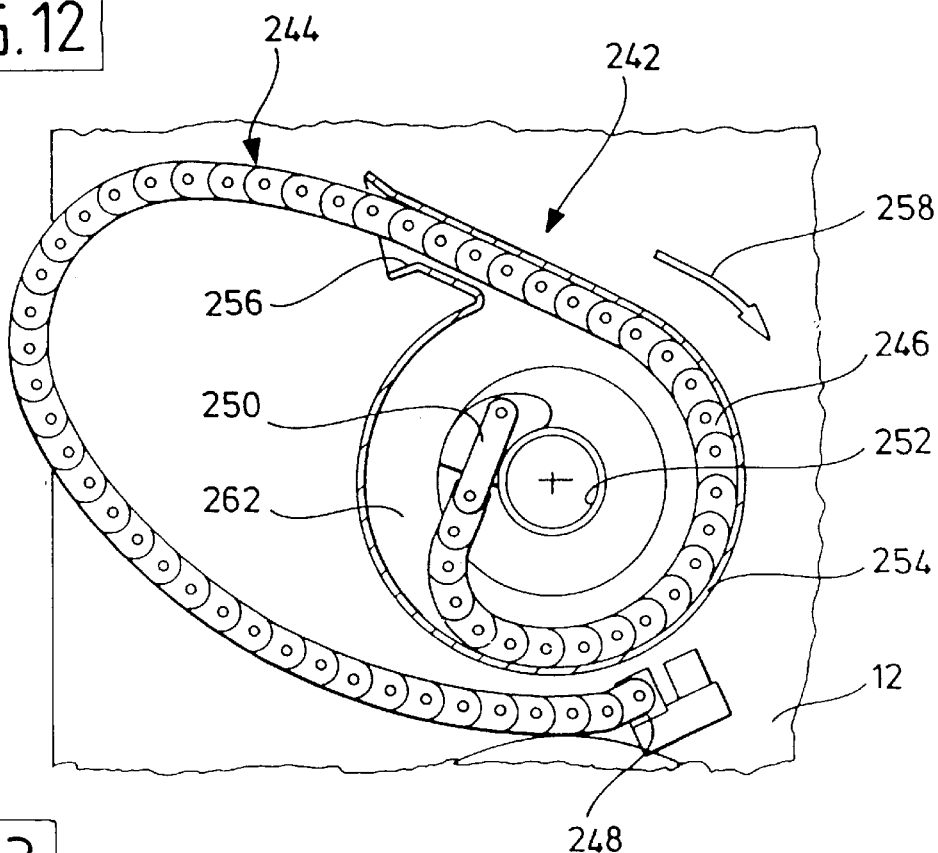
FIG. 12 is a section taken along line VII—VII in FIG. 1 with the cylinder in initial position.
Figure 13:
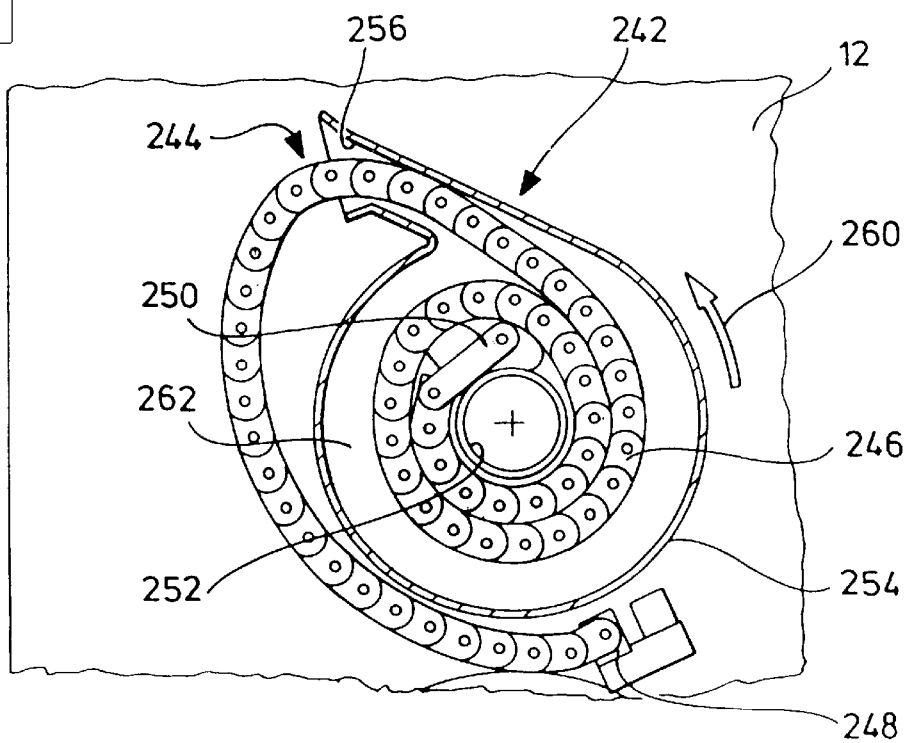
FIG. 13 is a section similar to FIG. 12 with the cylinder in end position.

As shown in FIG. 12 and FIG. 13, the respective cylinder 20 or 50 is rotatable around a maximum angle of 360—360/ (number of stations) degrees, for example, in this embodiment 300 degrees, from an initial position shown in FIG. 12 in the direction of the arrow 258 into an end position shown in FIG. 13, said end position of the supply strand 244 having wound itself around the tube 252 in the form of a tight spiral. Moreover, the respective cylinder 20 or 50 is rotatable in contrary direction to the arrow 258, i.e. in the direction of arrow 260, from the end position shown in FIG. 13 into the initial position shown in FIG. 12, in which case the supply strand 244 wound in a spiral shape around the tube 252 unwinds and pushes itself out of the worm casing 254 through the opening 256.

Guide discs 262, which hold the supply strand 244 in the plane 253 running perpendicular to the rotational axis 22, are preferably provided on both sides of the worm casing 254.

As a result, the respective cylinder 20 or 50 is rotatable, for example, around the angle of 300 degrees in individual steps so that each of the machining means 40 in the positions 42 passes through all the stations 190 or 192 until the end position is reached. Subsequently, a quick rotation back into the initial position occurs without stopping in the individual stations 190 or 192, and then extending from this passage with stops in the individual stations 190 or 192 occurs.

With a multiple-spindle turning machine according to the invention, the following machining operations are now possible with the versions to be described in detail below.

In a very simple version (FIG. 14) of the multiple-spindle turning machine according to the invention, each of the machining means 40 in the cylinder comprises a work piece spindle 140, in the work piece clamping means 142 of which a work piece W may be clamped.

The second cylinder 50 located opposite the first cylinder comprises tools 112 facing the operating area 18, held on tool holders 110 and arranged in the sleeves 64.

In the simplest case, it is even possible with this embodiment to anchor the cylinder 50 firmly in the second stand 14, and not construct it so that it can rotate around the rotational axis 22 by means of the rotary drive 58.

The work piece W is now movable in the direction of the tool 112 by moving the work piece spindle 140 in the direction of the central axis 78 of the sleeve, this movement constituting a Z-axis movement for machining the work piece W. The work piece W is in this case rotatably driven simultaneously by the built-in motor so that machining of the work piece W may be carried out on one side S1 by the Z-axis movement between the work piece W and the tool 112.

Such machining of the work piece W is carried out in station 190a, as shown in FIG. 14, for example. After machining of the work piece W has concluded in station 190a, the cylinder 20 is indexed on in such a way that the work piece W is positioned with the work piece spindle 140 in the immediately following station 190b, while the work piece W positioned in the previous station 190f is positioned with the work piece spindle 140 holding this in station 190a and therefore undergoes the same machining by relative movement along the Z-axis by means of the tool 112.

In a similar manner to the machining of work piece W by means of the tool 112, it is possible in another version, as shown in FIG. 15, to machine the work piece W, for example, in the spindle position 190b, by means of the rotating tool 118, which is mounted in position 62b in the machining means 40 constructed as a rotatable tool holding fixture 120, and is driven to rotate by the built-in motor 122 in the sleeve 64. In this case, the relative movement between the work piece W and the tool 118 along the Z-axis is also achieved by displacing the work piece spindle 140 in the sleeve 64 in the manner described in conjunction with FIG. 14. In this spindle station, the respective directly following work piece W may also be machined by indexing the cylinder 20 on—in the same manner as described in conjunction with the machining operation shown in FIG. 14.

In a further version of a multiple-spindle turning machine according to the invention, shown in FIG. 16, work piece spindles 140 are also provided in the sleeves 64 as machining means 40 in the cylinder 20, while work piece spindles 140 are also provided in the sleeves in the second cylinder 50. In this case, the second cylinder 50 is rotatable around the rotational axis 22 synchronously with the first cylinder 20, and the individual machining means 40 in the individual positions 42a and 62a are arranged coaxially to one another and clearly allocated to one another.

The synchronous rotation of the two cylinders 20 and 50 in this case occurs by synchronous actuation of the two rotary drives 28 and 58 constructed as numerically controlled rotational shaft members.

In this embodiment, both work piece spindles 140 are also preferably movable in the direction of the central axis 78.

With this version it is now possible to machine the work pieces W, for example, in the station 190a and 192a respectively by means of the tool 196 arranged respectively on a described carriage 194, in which case by moving the carriage 194, the tools 196 are on the one hand movable relative to the work piece W along the X-axis and on the other hand the work pieces W are movable relative to the tool 196 in the direction of the Z-axis by displacing the corresponding sleeve 64 in the direction of its central axis 78.

In this case, in station 190a, for example, machining of the work piece W occurs on side S1 and in station 192a machining of the work pieces W arranged opposite occurs on side S2, i.e. in each station a work piece W is machined on the front side S1 and the opposite work piece W on the rear side S2.

In such a version, it is additionally possible, for example, in stations 190f and 192f, to carry out a transfer of the work piece W from the work piece spindle 140 in position 42f into the work piece spindle 140 in position 62f by moving the work piece spindles 140 towards one another in the direction of their central axes 78 and transferring the work piece W from the work piece clamping means 142 in position 42f into the work piece clamping means 142 in position 62f, so that, for example, in stations 190a to 190e machining of the front side S1 of the work piece W occurs, in station 190f transfer of the work piece W occurs from the work piece spindle 140 in position 42f into the work piece spindle 140 in position 62f in station 192f, and from there in stations 192a to 192e, machining of the rear side S2 of the work piece W occurs.

In a further version of a multiple-spindle turning machine according to the invention, shown in FIG. 17, each machining means constructed as a work piece spindle 140 in positions 42 has a machining means allocated to it, which is also constructed as a work piece spindle 140, in which case the cylinders 20 and 50 are likewise synchronously rotatable relative to one another.

This version envisages clamping a work piece W by both work piece clamping means 142 of both work piece spindles 140 and turn the diameter of the work piece W in the manner of a shaft turning operation by means of a tool 196 on a carriage 194 over the entire length between the two work piece clamping elements 142. Such a shaft turning operation occurs, for example, in the opposite stations 190a and 192a, while in the other stations 190b to f and 192b to f, for example, an additional shaft machining operation is also still possible (e.g. in stations 190f and 192f) or machining of the work piece W on its end side (e.g. in stations 190e and 192e), and in this case the work piece spindles 140 are each constructed so that the work piece W may be pushed through a central guide channel 141 in the respective work piece spindle 140.

When machining the work piece W on its end side, a Z-axis movement occurs, as already described in conjunction with FIG. 16, for example, by displacing the respective work piece spindle 140 relative to the tool 196.

In addition, a displacement of the work piece spindles 140 in the direction of the central axis 78 is also necessary in order to clamp the work piece W either on both sides or to push the work piece W so far into the respective guide channel 141 that it is possible to machine it one its end side.

In a further version, shown in FIG. 18, a work piece spindle 140, which is displaceable along its central axis 78, is provided in each position 42 of the cylinder 20. A guide 170, described in conjunction with FIG. 9, is allocated to each work piece spindle 140 in each position 62 of the cylinder 50, in which case a material rod 172 projecting over the guide 170 into the operating area 18 may be fed through this guide 170.

The material rod 172 may be gripped at one end 173 by the work piece clamping means 142 of the work piece spindle 140 and removed from the guide 170 in the direction of the Z-axis. In this case, the tool 196, which stands close to the guide 170 in the operating area 18 to be displaceable in the direction of the Z-axis and is only movable in the direction of the X-axis, i.e. perpendicular to the central axis 78, is arranged on the carriage 194. This tool 196 enables longitudinal turning in that on the one hand the spindle 140 rotatably drives the material rod clamped at end 173 and on the other hand constantly removes it from the guide 170, and because of this the forward feed movement in Z-direction results so that the machined work piece W can be produced following the principle of Swiss-type longitudinal turning.

For example, such a longitudinal turning operation is possible in a portion of the opposing spindle stations 190a to f and 192a to f, while in another portion of the spindle stations cutting off or possibly machining on the end side occurs (e.g. in stations 190e and 192e), in which case the work piece spindle 140 is also preferably provided with the central guide channel 141 here so that the work piece W machined as part of the longitudinal turning may be pushed through the work piece spindle 140 coaxially to its central axis 78.

However, such a Swiss-type longitudinal turning process of the work piece W is also possible if, instead of the guide 170, a work piece spindle 140 is used, the work piece clamping means 142 of which serves only as a guide for the material rod 172 in the Swiss-type longitudinal turning process, so that the material rod may be pulled through the respective other work piece spindle 140, e.g. the work piece spindle 140 in positions 42, in the described manner out of the work piece spindle 140 in positions 62 and therefore the work piece spindle 140 in positions 62 works in the same manner for the Swiss-type longitudinal turning process.

However, the work piece spindle 140 in positions 62 can additionally serve to carry out an end side machining operation in the other stations 190 and 192 on the one hand of the material rod pushed through these in the region of the end 173, and on the other hand of the opposite end 171, which has been formed by cutting the work piece W off the material rod 172, by means of one of the work piece spindles 140 in positions 42.

As already provided in the above versions, a work piece spindle 140 is provided in each of the positions 42 in a further version, shown in FIG. 19, this work piece spindle being displaceable in the direction of the central axis 78, and opposite this a tailstock 180 is displaceable in the opposite positions 62, in which case the sleeve 64 preferably also supporting the tailstock 180 is displaceable in the direction of its central axis 78.

As a result, longitudinal turning of the work piece W is possible by clamping this on the one side in the work piece clamping means 142 of the work piece spindle 140 and on the other side in the tailstock 80, in which case a forward feed movement in Z-direction is achieved by synchronous displacement of the two sleeves 64 in positions 42 and 62 allocated to one another. Such longitudinal turning is possible in one of the opposing spindle stations 190a to 190f and 192a to 192f or is also possible in only a portion thereof.

In this case, the cylinders 20 and 50 are rotatable synchronously with one another around the rotational axis 22 so that the work piece W may respectively be moved from a pair of opposing stations 190a and 192a into a next pair of opposing stations 190b and 192b by indexing the cylinders 20 and 50 on in order to carry out further machining with the respectively following stations.

What is claimed is:

1. A multiple-spindle turning machine, comprising:

a machine frame;

a drum that is carried by said machine frame and is rotatable relative to the machine frame around an essentially horizontal rotational axis of said drum;

a support which is carried by said machine frame and is rotatable around a rotational axis parallel to the rotational axis of the drum;

an operating area being provided between said drum and said support;

work piece spindles arranged on the drum in respective individual positions, and having respective spindle axes;

a linear drive associated with each of said work piece spindles;

each linear drive being disposed on the drum to move the associated work piece spindle in the direction of their respective spindle axes;

said work piece spindles being aligned essentially parallel to the rotational axis of the drum and, during the machining of a work piece, said work piece spindles are independently movable by said linear drives relative to the drum in the direction of their respective spindle axes;

each of said work piece spindles being constantly coupled to its respective linear drive;

a spindle motor associated with each of said work piece spindles for rotatably driving the associated work piece spindle;

at least one machining unit arranged on said support on a side of the operating area opposite the drum such that at least one of the work piece spindles is adapted to cooperate with said at least one machining unit for machining a work piece; and separate rotational drives for independently driving the drum and the support.

2. A multiple-spindle turning machine according to claim 1, wherein:

the work piece spindles may be specifically positioned and fixed with respect to their position in the direction of their spindle axes by the associated linear drives.

3. A multiple-spindle turning machine according to claim 1, wherein:

the linear drives are constructed as numerically controlled spindle drives for moving the work piece spindles in the direction of their spindle axes.

4. A multiple-spindle turning machine according to claim 1, wherein:

the linear drives are arranged on the drum to lie radially outward of the associated work piece spindles with respect to the rotational axis of the drum.

5. A multiple-spindle turning machine according to claim 4, wherein:

the linear drives are angularly offset from the associated work piece spindles relative to the rotational axis of the drum.

6. A multiple-spindle turning machine according to claim 1, wherein:

the work piece spindles are constructed as motor spindles.

7. A multiple-spindle turning machine according to claim 1, wherein:

the support is rotatable coaxially to the rotational axis of the drum.

8. A multiple-spindle turning machine according to claim 7, wherein:

the support with respect to its rotational movement around the rotational axis of the drum is coupled rigidly to the drum.

9. A multiple-spindle turning machine according to claim 1, wherein:

a section of the operating area located between a face of the drum and face of the support is constructed without any mechanical connections between the drum and the support.

10. A multiple-spindle turning machine according to claim 1, wherein:

the drum is rotatably controlled as a numerically controlled rotational axis.

11. A multiple-spindle turning machine according to claim 1, wherein:

the support is rotatably controlled as a numerically controlled rotational axis.

12. A multiple-spindle turning machine according to claim 1, wherein:

the machining unit is allocated to one of the work piece spindles during machining of the work piece and may be positioned opposite the allocated work piece spindle relative to the operating area.

13. A multiple-spindle turning machine according to claim 12, wherein:

the support carries several machining units and each machining unit is arranged so that it cooperates with at least one allocated work piece spindle of the drum.

14. A multiple-spindle turning machine according to claim 12, wherein:

the machining unit is constructed so that it can be allocated to each of the work piece spindles of the drum.

15. A multiple-spindle turning machine according to claim 12, wherein:

during machining of the work piece, the machining unit is aligned with a central axis coaxially to the spindle axis of the work piece spindle allocated thereto.

16. A multiple-spindle turning machine according to claim 12, wherein:

the machining unit may be rotated around the rotational axis of the drum synchronously with the allocated work piece spindle.

17. A multiple-spindle turning machine according to claim 1, wherein:

the machining unit may be moved relative to the support parallel to the direction of the rotational axis of the drum and independently of the other machining units.

18. A multiple-spindle turning machine according to claim 17, wherein:

each machining unit is allocated its own linear drive for movement of each machining unit in the direction of the rotational axis of the drum.

19. A multiple-spindle turning machine according to claim 18, wherein:

the machining unit is constantly coupled to its linear drive.

20. A multiple-spindle turning machine according to claim 17, wherein:

the machining unit is solely movable linearly relative to the support.

21. A multiple-spindle turning machine according to claim 17, further comprising:

numerically controlled means for moving the machining unit in a direction parallel to the rotational axis of the drum.

22. A multiple-spindle turning machine according to claim 1, wherein:

a machining element may be positioned in front of a face of the drum or the support facing the operating area.

23. A multiple-spindle turning machine according to claim 22, wherein:

the machining element stands in front of a face of the drum or the support.

24. A multiple-spindle turning machine according to claim 1, wherein at least one of the drum and the support are rotatable from an initial position about a maximum angle into an end position, and from the end position back again into the initial position, further comprising:

a flexible supply strand arranged between the machine frame and the drum or support;

said flexible supply strand being firmly connected to the machine frame at one end thereof and to the drum or support at the other end thereof, and through its flexibility of rotational movement, being adapted to follow around the maximum angle.

25. A multiple-spindle turning machine according to claim 1, further comprising:

tools arranged on tool supports for machining the work pieces held in the work piece spindles.

* * * * *